Feb. 7, 1933.  A. F. BURGESS ET AL  1,896,067
DEMOUNTABLE POWER TAKE-OFF
Filed Feb. 13, 1932

INVENTORS
Albert F. Burgess
Harry L. Blaisdell
BY William H. Campbell

ATTORNEY

Patented Feb. 7, 1933

1,896,067

UNITED STATES PATENT OFFICE

ALBERT F. BURGESS, HARRY L. BLAISDELL, AND WILLIAM H. CAMPBELL, OF MELROSE HIGHLANDS, MASSACHUSETTS

DEMOUNTABLE POWER TAKE-OFF

Application filed February 13, 1932. Serial No. 592,828.

(GRANTED UNDER THE ACT OF MARCH 3, 1883, AS AMENDED APRIL 30, 1928; 370 O. G. 757)

The invention covered by this application may be manufactured and used by or for the Government for governmental purposes, without the payment of any royalty thereon.

Chassis formerly employed for spraying purposes were of heavy type in order to obtain the required engine power, and had the transmission gear box mounted "amidship" i. e., at some distance to the rear of the engine. On these chassis the power take-off is located on the drive shaft between engine and transmission, in order to provide a higher driving speed for the power take-off when the truck was moving forward at low speed, as in roadside spraying. Spraying equipment mounted on these chassis is necessarily cumbersome on account of the length of wheelbase and weight of chassis and is difficult to handle on the poor roads and trails frequently encountered in forest work. The high power, light weight type of chassis which has recently been placed on the market makes it possible to provide much lighter and more easily handled equipment for high power spraying. However, these later chassis are all designed with the transmission gears close up to the engine so that it is impossible to attach a power take-off between engine and transmission. A simple form of power take-off can only be applied to the drive shaft in the rear of the transmission. So located, the speed of the power take-off is, necessarily, extremely slow, when the truck is being driven at slow speed along the road under its own power, as in roadside spraying. High power spraying machines used for both roadside and forest spraying, or any other auxiliary apparatus, the power and speed requirements of which vary over a wider range than can be taken care of by a single speed drive from the power take-off, require a drive the speed ratio of which is capable of being readily changed.

The combination of the power take-off and countershaft drive hereinafter more fully described, provides such a drive without introducing additional complications in construction.

Fig. 1 is a longitudinal vertical section of the demountable power take-off device.

Fig. 2 is a plan view of that portion of a motor vehicle chassis showing the demountable power take-off assembly and countershaft drive installation.

Similar numerals refer to similar parts throughout the several views.

Referring to Fig. 1, it will be seen that on the rear end of drive shaft 1 is mounted coupling shaft 2. The forward end of this coupling shaft 2 is hollow and is internally splined or otherwise suitably machined to operatively engage correspondingly machined surfaces on rear end of drive shaft 1.

Coupling shaft 2 is secured to drive shaft 1 by means of cap screw 3, washer 4, and lock washer 5. Coupling shaft 2 is supported by means of ball bearing 6, which is mounted in housing 7. Housing 7 is mounted on and secured by means of bolts 8 to the vertical portion or web of cross-member 9 of the motor vehicle chassis frame. The rear end of coupling shaft 2 is provided with flange 10.

The forward end of power take-off shaft 11 is provided with corresponding flange 12. Flanges 10 and 12 are bolted together by means of bolts 13.

Shaft 1, coupling shaft 2 and power take-off shaft 11, when assembled, as described, constitute a single concentric driving shaft unit capable of withstanding both tortional and bending stresses. On the forward portion of power take-off shaft 11 is mounted free-running sprocket 14, which is not affixed to shaft 11 but runs freely upon the frame. Free-running sprocket 14 is prevented from moving longitudinally upon shaft 11 by means of the flange 12 upon the forward end and upon the rear end by collar 15 which is attached to shaft 11 by means of setscrew 16.

On the rear side of this sprocket are formed clutch teeth 17 which are adapted to engage corresponding clutch teeth 18 formed on the forward side of sliding clutch jaw 19, which is splined to power take-off shaft 11 so that it is compelled to rotate with it and at the same time is free to move longitudinally upon said shaft.

A second sliding clutch jaw 20 similarly splined to power take-off shaft 11 is provided on its rearward face with clutch jaw 21, adapted to engage corresponding clutch teeth on the forward face of clutch jaw 22.

Sliding clutch jaws 19 and 20 may thus be moved longitudinally upon power take-off shaft 11 in such manner as to engage clutch teeth 17 and 22, or may be disengaged from the same. Clutch jaw 22 is affixed by means of bolts 23 to flange 24 which is formed on forward end of driven shaft 25. Driven shaft 25 is mounted on ball bearing 26, which is enclosed in housing 27. Housing 27 is affixed by means of bolts 28 to vertical portion or web of cross-member 29 of motor vehicle chassis. Clutch jaw 22 is provided with ball bearing 30 in which is mounted rear end power take-off shaft 11. Upon the rear end of driven shaft 25 is affixed the conventional universal joint assembly through which power is transmitted to the rotor wheels of the motor vehicle in the conventional manner.

Referring to Fig. 2, fork shifting rod 31 engages sliding clutch jaw 19. Fork shifting rod 32 engages sliding clutch jaw 20.

Driving chain 33 engages free-running sprocket 14 and also sprocket 34 which is mounted on counter shaft 35. Counter shaft 35 is mounted in ball bearings (not shown) enclosed in housings 36 and 37, which are mounted upon the cross-members 9 and 29, respectively, of motor vehicle chassis.

The rear end of counter shaft 35 extends through housing 37 and sprocket 38 is mounted thereon (by suitable means not shown).

Having thus described our invention, what we claim for Letters Patent is:

1. In a device of the character described, flanged forward and rear shaft sections journaled on cross-members of motor vehicle chassis frame, a flanged, intermediate shaft section, means for demountably securing the forward shaft section to the intermediate shaft section, means for selectively effecting an integral or independent relation of the intermediate and rear shaft sections, demountable means for maintaining linear relation of intermediate and rear shaft sections, a driving member rotatably mounted on the intermediate shaft section, a mating clutch member splined against rotation but slidably mounted on the intermediate shaft section adjacent to the driving member, and, means for engaging and disengaging the driving member and mating clutch member.

2. In a device of the character described flanged forward and rear shaft sections journaled on cross-members of motor vehicle frame, a flange intermediate shaft section, a driving member rotatably mounted on the intermediate shaft section and having clutch teeth, a splined portion on the intermediate shaft section, a splined clutch member slidably mounted on said splined portion, means for engaging or disengaging the driving member and the clutch member, a demountable flange having on its forward face clutch teeth, means for concentrically securing said demountable flange to flanged forward end of rear shaft section, means for maintaining linear relation of shafts, a second splined clutch member slidably mounted on the splined portion, means for engaging and disengaging the second clutch member and the demountable flange.

ALBERT F. BURGESS.
HARRY L. BLAISDELL.
WILLIAM H. CAMPBELL.